(12) United States Patent
Li et al.

(10) Patent No.: US 10,516,151 B2
(45) Date of Patent: Dec. 24, 2019

(54) TOP COVER OF POWER BATTERY AND POWER BATTERY

(71) Applicant: CONTEMPORARY AMPEREX TECHNOLOGY CO., LIMITED, Ningde (CN)

(72) Inventors: Quankun Li, Ningde (CN); Pinghua Deng, Ningde (CN); Peng Wang, Ningde (CN); Jian Guo, Ningde (CN); Lingbo Zhu, Ningde (CN); Yongshou Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 364 days.

(21) Appl. No.: 15/435,681

(22) Filed: Feb. 17, 2017

(65) Prior Publication Data
US 2017/0352860 A1 Dec. 7, 2017

(30) Foreign Application Priority Data
Jun. 7, 2016 (CN) .......................... 2016 1 0399651

(51) Int. Cl.
*H01M 2/34* (2006.01)
*H01M 2/04* (2006.01)
(Continued)

(52) U.S. Cl.
CPC ........... *H01M 2/345* (2013.01); *H01M 2/043* (2013.01); *H01M 2/0473* (2013.01);
(Continued)

(58) Field of Classification Search
CPC ............ H01M 10/34; H01M 2200/20; H01M 2220/20; H01M 2/043; H01M 2/0473;
(Continued)

(56) References Cited

U.S. PATENT DOCUMENTS 8,679,670 B2 3/2014 Onnerud
2010/0279156 A1* 11/2010 Kim .................... H01M 2/0404
429/56
(Continued)

FOREIGN PATENT DOCUMENTS

CN 203631651 U 6/2014
CN 105098108 A 11/2015
(Continued)

OTHER PUBLICATIONS

Office Action from corresponding Chinese Application No. 201610399651.1, dated Feb. 13, 2018.
(Continued)

*Primary Examiner* — Adam A Arciero
(74) *Attorney, Agent, or Firm* — Tucker Ellis LLP

(57) ABSTRACT

The present application provides a top cover of power battery, including top cover plate, first electrode unit and second electrode unit, the first electrode unit includes insulation piece, conductive plate, deformable plate and sealing piece, the top cover plate is provided with deformable plate connecting hole and fixing hole, the deformable plate seals the deformable plate connecting hole, the insulation piece is provided with top cover plate connecting portion and conductive plate connecting portion, the insulation piece is fixed underneath the top cover plate through cooperation of top cover plate connecting portion and fixing hole, the conductive plate is insulated from and fixed with the top cover plate through the conductive plate connecting portion, the conductive plate is electrically connected with the deformable plate, the sealing piece seals path from the fixing hole to interior of the power battery passing through gap between insulation piece and top cover plate.

14 Claims, 2 Drawing Sheets

(51) Int. Cl.
 H01M 2/08 (2006.01)
 H01M 10/34 (2006.01)
 H01M 2/12 (2006.01)

(52) U.S. Cl.
 CPC ....... H01M 2/0482 (2013.01); H01M 2/0486 (2013.01); H01M 2/08 (2013.01); H01M 10/34 (2013.01); H01M 2/1241 (2013.01); H01M 2200/20 (2013.01); H01M 2220/20 (2013.01)

(58) Field of Classification Search
 CPC .... H01M 2/0482; H01M 2/0486; H01M 2/08; H01M 2/1241; H01M 2/345
 See application file for complete search history.

(56) References Cited

U.S. PATENT DOCUMENTS

| | | | |
|---|---|---|---|
| 2012/0183817 A1* | 7/2012 | Guen | H01M 2/30 429/61 |
| 2013/0029190 A1* | 1/2013 | Kim | H01M 2/34 429/61 |
| 2014/0112164 A1 | 4/2014 | Nagata | |
| 2015/0171411 A1* | 6/2015 | Kobayashi | H01M 2/22 429/61 |
| 2015/0188119 A1 | 7/2015 | Gao | |

FOREIGN PATENT DOCUMENTS

| | | |
|---|---|---|
| CN | 204946952 U | 1/2016 |
| CN | 205723666 U | 11/2016 |
| JP | 5415413 B2 | 2/2014 |
| JP | 2014086177 A | 5/2014 |

OTHER PUBLICATIONS

European Search Report to corresponding European Application No. 17151089.4, dated May 29, 2017; 5 pages.

Japanese Search Report from corresponding Japanese Application No. 2016-154030, dated Jun. 20, 2017, 4 pages.

\* cited by examiner

TOP COVER OF POWER BATTERY AND POWER BATTERY

CROSS-REFERENCE TO RELATED APPLICATIONS

This application claims the priority to and the benefit of Chinese Patent Application No. 2016103996511 filed on Jun. 7, 2016, the content of which is incorporated herein by reference in its entirety.

TECHNICAL FIELD

The present application relates to the field of energy storage device and, particularly, relates to a top cover of a power battery and the power battery.

BACKGROUND

In order to solve the over-charging problem of the EV shell battery, a general solution adopted in the industry is to cut off the main circuit before the cell loses efficacy, so as to prevent the battery from being charged continuously thereby ensure the safety of the battery.

At present, for a square shaped shell battery, a current interrupting device (CID) may be adopted. That is, the positive electrode main circuit includes an air pressure deformable plate and a conductive plate which is integrated with the CID as a whole. The periphery of the conductive plate is connected with an electrode tab of bare cell through welding, the CID portion of the conductive plate is connected with the deformable plate as a whole through welding, and the deformable plate is connected with a top cover through welding so as to conduct a current to a positive terminal.

The conductive plate is fixed on the top cover plate through an insulation piece, at the same time, the conductive plate integrated with the CID as a whole is insulated from the top cover plate. However, it is found that the air leaking problem may exist at the fixing hole during using process.

SUMMARY

The present application provides a top cover of a power battery and the power battery, which can solve the above problems.

A first aspect of the present application provides a top cover of a power battery, including:

a top cover plate, a first electrode unit and a second electrode unit, the first electrode unit includes an insulation piece, a conductive plate, a deformable plate and a sealing piece, the top cover plate is provided with a deformable plate connecting hole and a fixing hole, the deformable plate seals the deformable plate connecting hole, the insulation piece is provided with a top cover plate connecting portion and a conductive plate connecting portion, the insulation piece is fixed underneath the top cover plate through a cooperation of the top cover plate connecting portion and the fixing hole, the conductive plate is insulated from and fixed with the top cover plate through the conductive plate connecting portion, the conductive plate is electrically connected with the deformable plate, the sealing piece seals a path from the fixing hole to an interior of the power battery passing through a gap between the insulation piece and the top cover plate.

Preferably, the fixing hole is a ladder hole with a top diameter larger than a bottom diameter, the sealing piece is inserted into the fixing hole from the top, and seals the fixing hole.

Preferably, an upper surface of the sealing piece is aligned with an upper surface of the top cover plate.

Preferably, a periphery surface of the sealing piece which matches the fixing hole is uniformly inclined from top to bottom.

Preferably, the fixing hole includes at least a three-stage ladder structure, the sealing piece is located in a topmost stage of the ladder structure.

Preferably, a top portion of the top cover plate connecting portion abuts against the sealing piece.

Preferably, a top surface of the top cover plate connecting portion is a flat surface, a bottom surface of the sealing piece is also a flat surface, the top surface of the top cover plate connecting portion is fitted with the bottom surface of the sealing piece.

Preferably, the sealing piece is arranged around the top cover plate connecting portion, and is pressed and sealed with a lower surface of the top cover plate.

Preferably, a sealing piece accommodating slot is provided on the insulation piece, the sealing piece accommodating slot is provided around the top cover plate connecting portion, the sealing piece is arranged in the sealing piece accommodating slot.

Preferably, the sealing piece is of a circular ring shape.

Preferably, the insulation piece is integratedly formed, the sealing piece protrudes from an upper surface of the insulation piece.

Preferably, the sealing piece is a ring flange.

Preferably, the top cover plate connecting portion is a clamping piece, which is clamped with the fixing hole.

Preferably, the top cover plate connecting portion is a fixing column, the fixing column extends into the fixing hole and is fixed through hot melting.

Preferably, the top cover plate connecting portion is integratedly or separately arranged with the insulation piece.

A second aspect of the present application provides a power battery, including the top cover of the power battery.

The technical solution provided by the present application can achieve the following beneficial effect:

The power battery provided by the present application effectively avoids the problem of the power battery leaking air from the fixing hole during using process through arranging the sealing piece for sealing.

It should be understood that, the above general description and the following detailed description are just exemplary, which cannot limit the present application.

REFERENCE SIGNS

Figure 1:
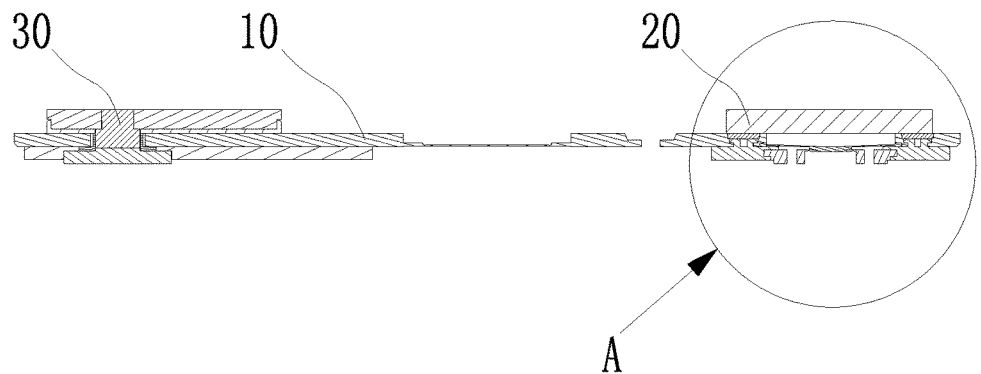
FIG. 1 is a lateral sectional diagram of a whole top cover of a power battery provided by an embodiment of the present application.

10—top cover plate;
100—deformable plate connecting hole;
102—fixing hole;
20—first electrode unit;
200—insulation piece;
　200a—top cover plate connecting portion;
　200b—conductive plate connecting portion;
　200c—sealing piece accommodating slot;
202—conductive plate;
204—deformable plate;
206—sealing piece;
208—connecting plate;
30—second electrode unit.

These drawings are incorporated into the specification and constitute as a part of the specification, which show embodiments of the present application, and are used to illustrate the principle of the present application together with the specification.

DESCRIPTION OF EMBODIMENTS

The present application will be described in further detail through specific embodiments and accompany drawings. The "front", "back", "left", "right", "up", "down" are referring to the placing state of a top cover of a power battery and a power battery in the drawings.

Figure 2:
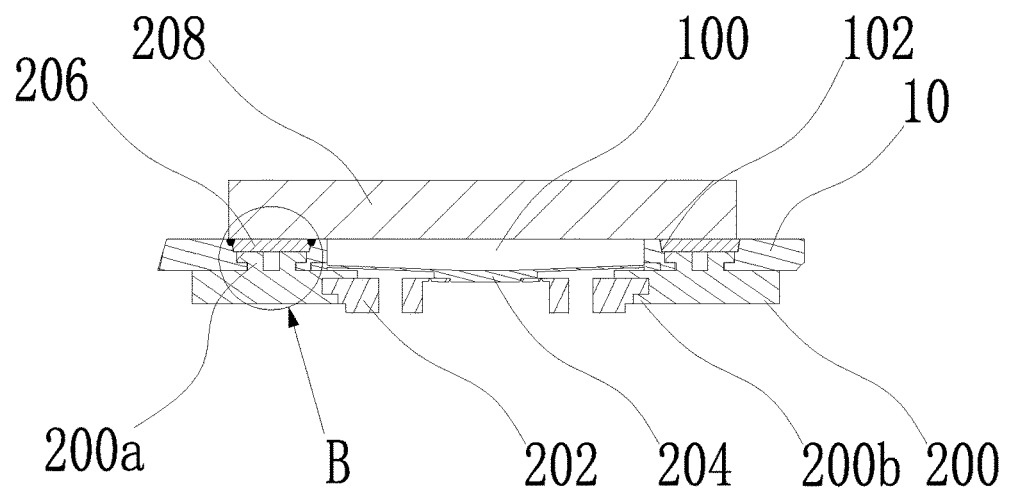
FIG. 2 is a partial enlarged schematic diagram of part A of the top cover of the power battery in FIG. 1, of which a fixing hole is directly sealed by a sealing piece provided by an embodiment of the present application.

As shown in FIG. 1, an embodiment of the present application provides a top cover of a power battery, including a top cover plate 10, a first electrode unit 20 and a second electrode unit 30. The second electrode unit 30 is electrically insulated from the top cover plate 10. As shown in FIG. 2, the first electrode unit 20 includes an insulation piece 200, a conductive plate 202, a deformable plate 204 and a sealing piece 206. In the present embodiment, a deformable plate connecting hole 100 and a fixing hole 102 are provided on the top cover plate 10, the deformable plate 204 is fixed in the deformable plate connecting hole 100, which needs to be able to seal the deformable plate connecting hole 100, the insulation piece 200 is located underneath the top cover plate 10, the conductive plate 202 is integrated with a CID, and is electrically connected with the deformable plate 204, the electrical connection manner is that the middle portion of the deformable plate 204 is fixedly connected with the CID on the conductive plate 202 together through welding or other manners.

The deformable plate 204 can turn and separate from the electrical connection status with the conductive plate 202 when the pressure in the interior of the power battery exceeds a reference pressure.

The deformable plate 204 is sealed in the deformable plate connecting hole 100, the periphery of the deformable plate 204 can be welded at the top or the bottom of the deformable plate connecting hole 100 (as shown in FIG. 1), as long as the deformable plate connecting hole 100 can be sealed. Obviously, the deformable plate 204 can also be formed with the top cover plate 10 as a whole, that is, the top cover plate punches a deformable plate at the deformable plate connecting hole, the deformable plate can be located at the top or the bottom of the deformable plate connecting hole 100.

In order to firmly fix the conductive plate 202, and prevent the conductive plate 202 from breaking, losing efficacy or deformation during normal assembling and using process, a top cover plate connecting portion 200a and a conductive plate connecting portion 200b are arranged on the insulation piece 200 of the present embodiment. The top cover plate connecting portion 200a is connected with the fixing hole 102, so as to fix the insulation piece 200, the conductive plate 202 is fixed through the conductive plate connecting portion 200b.

There are multiple cooperation manners between the fixing hole 102 and the top cover plate connecting portion 200a, for example, the fixing hole 102 is a ladder hole with a top diameter larger than a bottom diameter, the top cover plate connecting portion 200a is designed to be a clamping piece, the clamping piece is clamped in the fixing hole 102. Or, the top cover plate connecting portion 200a can be designed to be a fixing column, after the fixing column extends into the fixing hole 102, the shape of a top end thereof is changed through hot melting, so that he fixing column is fixed in the fixing hole 102. Since the insulation piece 200 is generally made of plastic material, which already has good elasticity and hot-melting performance, thus the top cover plate connecting portion 200a can be arranged with other parts of the insulation piece 200 as a whole. Obviously, the top cover plate connecting portion 200a and the insulation piece 200 can adopt a split type structure, for example, the top cover plate 10 is riveted with the insulation piece 200 together through a rivet.

In order to prevent the fixing hole 102 from leaking air, the sealing piece 206 is needed to seal a path from the fixing hole 102 to the interior of the power battery passing through a gap between the insulation piece 200 and the top cover plate 10. That is, as long as the sealing piece 206 can seal any position of the path, air can be stopped leaking from the fixing hole 102 or outer air can be stopped entering into the interior of the battery through the fixing hole 102.

Figure 3:
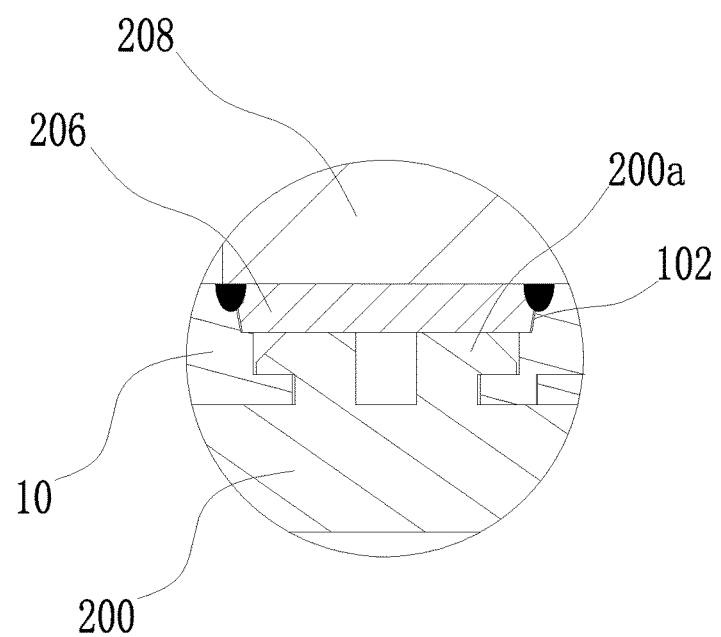
FIG. 3 is a partial enlarged schematic diagram of part B in FIG. 2.

Multiple designs are provided in the present embodiment. As shown in FIG. 2 and FIG. 3, in the situation that the fixing hole 102 adopts a ladder hole with a top diameter larger than a bottom diameter, after the assembling connection of the top cover plate connecting portion 200a and the fixing hole 102 is completed, the sealing piece 206 can be inserted into the fixing hole 102 from the top, and then the fixing hole 102 is sealed.

Generally, since the upper surface of the top cover plate 10 will be connected with other components, therefore, for convenient connection, the upper surface of the top cover plate 10 is preferred to be kept flat. Therefore, after the sealing piece 206 is inserted into the fixing hole 102, the upper surface of the sealing piece 206 is preferred to be kept aligning with the upper surface of the top cover plate 10. For more convenient connection, the first electrode unit 20 of the present embodiment also includes a connecting plate 208, the connecting plate 208 is arranged on the upper surface of the top cover plate 10, and covers the fixing hole 102. Since the sealing piece 206 is aligned with the upper surface of the top cover plate 10, thus the connecting plate 208 can be closely fitted with the top cover plate 10 as well as the sealing piece 206 so as to, on one hand, improve the connection strength, one the other hand, also achieve the effect of sealing and blocking of the fixing hole 102, thereby further reducing the probability of air leaking.

As shown in FIG. 3, in order to further improve the sealing performance between the sealing piece 206 and the fixing hole 102, the periphery surface of the sealing piece 206 can be designed to be an inclined surface inclining uniformly from top to bottom, at the same time, the fixing hole 102 is matched with the periphery surface of the sealing piece 206. Thus, with the help of the inclined surface, the cooperation of the sealing piece 206 and the fixing hole 102 becomes more tightly.

Since a top cover plate connecting portion 200a and a sealing piece 206 are arranged in the fixing hole 102 at the same time, therefore, in order to prevent the two components from interfering with each other, referring to FIG. 3, the fixing hole 102 in the present embodiment at least includes a three-stage ladder structure, the sealing piece 206 is located in the topmost stage of the ladder structure, which will not fall down. And the other ladder structures at the bottom can be left for the top cover plate connecting portion 200a. Through this manner, the interior space of the fixing hole 102 can be reasonably allocated.

In this structure, only the edge position of the sealing piece 206 is supported by the ladder structure, most of the middle area may be in a hanging status, which is disadvantage to the stability of the structure of the sealing piece 206. Therefore, through a reasonable size design, the present embodiment can make the top of the top cover plate connecting portion 200a abut against the sealing piece 206, so as to provide support for the middle portion of the sealing piece 206. In this situation, in order to increase the supporting area, the top surface of the top cover plate connecting portion 200a is preferred to be designed as a flat surface, at the same time, the bottom surface of the sealing piece 206 is also preferred to be designed as a flat surface, so as to increase the supporting area through a manner of fitting the two surfaces to each other.

In the present embodiment, the sealing piece 206 can adopt materials such as aluminum, or nickel or stainless steel, and can be sealed and fixed in the fixing hole 102 through a welding manner. The shape of the section of the sealing piece 206 can be circular, square, oval or other different shapes, as long as it can be ensured that the sealing piece 206 can be matched with the fixing hole 102.

Figure 4:
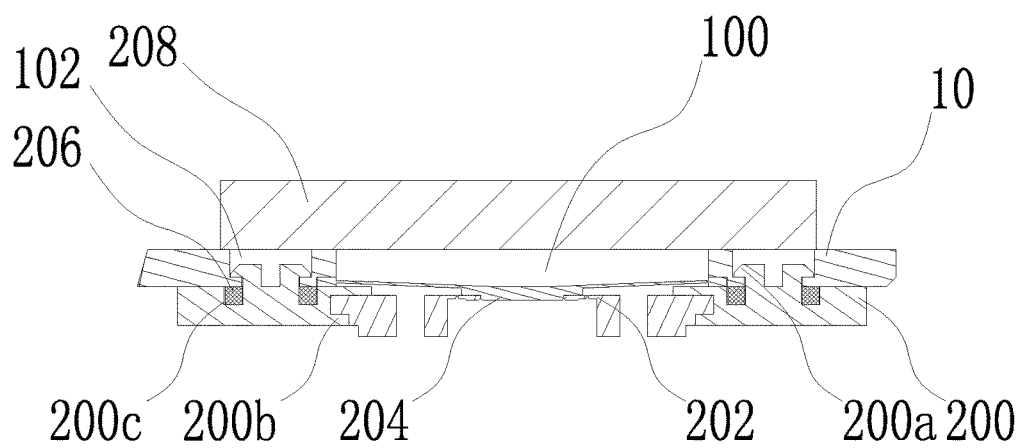
FIG. 4 is a partial enlarged structural schematic diagram of part A of the top cover of the power battery in FIG. 1, of which a gap between an insulation piece and a top cover plate is sealed by a sealing piece provided by an embodiment of the present application.

As shown in FIG. 4, the sealing piece 206 can be arranged around the top cover plate connecting portion 200a, and sealed with the lower surface of the top cover plate 10 through pressing. Since the sealing piece 206 seals the periphery of the top cover plate connecting portion 200a, therefore, the air in the power battery cannot enter into the fixing hole 102 through the sealing piece 206, and thus cannot escape to the outside of the power battery through the fixing hole 102.

As shown in FIG. 4, in the present embodiment, a sealing piece accommodating slot 200c can be arranged on the insulation piece 200 to accommodate the sealing piece 206. The sealing piece accommodating slot 200c is arranged around the top cover plate connecting portion 200a, the sealing piece 206 is arranged in the sealing piece accommodating slot 200c. In order to generate a larger pressing force between the sealing piece 206 and the top cover plate 10 to press the sealing piece 206 tightly, the depth of the sealing piece accommodating slot 200c is preferred to be smaller than the height of the sealing piece 206, thus, a portion of the sealing piece 206 can protrude after being inserted into the sealing piece accommodating slot 200c, and then, after the sealing piece accommodating slot 200c is connected with the fixing hole 102, the protruding portion will be pressed toward the bottom of the sealing piece accommodating slot 200c, so that the sealing piece 206 is pressed and sealed with the sealing piece accommodating slot 200c and the top cover plate 10 at the same time.

In the present embodiment, the sealing piece 206 can be designed to be a ring shaped sealing ring. The material adopted is preferred to be fluorine rubber, PFA, PE and the like with good tolerance to the electrolyte of the power battery.

Since the pressing force between the sealing piece 206 and the top cover plate 10 is mainly provided by the cooperation of the top cover plate connecting portion 200a and the fixing hole 102, and the insulation piece 200 is generally made of plastic material with elasticity, therefore, the further the distance between the sealing piece 206 and the top cover plate connecting portion 200a is, the smaller the acting force suffered from the insulation piece 200 and the top cover plate 10 is, and the worse the sealing effect is. Therefore, in the present embodiment, it is preferred that the sealing piece accommodating slot 200c is arranged close to the top cover plate connecting portion 200a, so that the sealing piece 206 can obtain more pressing force, thereby improving the sealing effect. Furthermore, the acting force between the top cover plate connecting portion 200a and the fixing hole 102 also plays an important role to the sealing effect, in the present embodiment, the top cover plate connecting portion 200a is preferred to adopt a clamping piece, such structure only needs to be provide with an instantaneous force to push the clamping piece into the fixing hole during the assembling process, and then the clamping piece can be firmly clamped with the fixing hole 102 together for a long time.

Besides, it is also considerable that the sealing piece 206 can be formed with the insulation piece 200 as a whole to be an integrated structure, for example, a ring flange shaped sealing piece 206 protruding from the upper surface of the insulation piece 200 is directly arranged on the upper surface thereof, since the sealing piece 206 protrudes from the upper surface of the insulation piece, thereby can be pressed and sealed with the lower surface of the top cover plate 10.

The present application also provides a power battery, which can effectively prevent air leaking through adopting the top cover of the power battery.

The above are just the preferred embodiments of the present application, which will not limit the present application, for those skilled in the art, the present application can have various modifications and variations. Any modifications, equivalent replacements and improvements made within the spirit and principle of the present application shall fall in the protection scope of the present application.

What is claimed is:

1. A top cover of a power battery, characterized in that, comprising a top cover plate, a first electrode unit and a second electrode unit, the first electrode unit comprises an insulation piece, a conductive plate, a deformable plate and a sealing piece, the top cover plate is provided with a deformable plate connecting hole and a fixing hole, the deformable plate seals the deformable plate connecting hole, the insulation piece is provided with a top cover plate connecting portion and a conductive plate connecting portion, the insulation piece is fixed underneath the top cover plate through a cooperation of the top cover plate connecting portion and the fixing hole, the conductive plate is insulated from and fixed with the top cover plate through the conductive plate connecting portion, the conductive plate is electrically connected with the deformable plate, the sealing piece seals a path from the fixing hole to an interior of the power battery passing through a gap between the insulation piece and the top cover plate, and the top cover plate connecting portion is a clamping piece, which is clamped with the fixing hole.

2. The top cover of the power battery according to claim 1, characterized in that, the fixing hole is a ladder hole with a top diameter larger than a bottom diameter, the sealing piece is inserted into the fixing hole from the top, and seals the fixing hole.

3. The top cover of the power battery according to claim 2, characterized in that, an upper surface of the sealing piece is aligned with an upper surface of the top cover plate.

4. The top cover of the power battery according to claim 2, characterized in that, a periphery surface of the sealing piece which matches the fixing hole is uniformly inclined from top to bottom.

5. The top cover of the power battery according to claim 4, characterized in that, the fixing hole includes at least a three-stage ladder structure, the sealing piece is located in a topmost stage of the ladder structure.

6. The top cover of the power battery according to claim 5, characterized in that, a top portion of the top cover plate connecting portion abuts against the sealing piece.

7. The top cover of the power battery according to claim 6, characterized in that, a top surface of the top cover plate connecting portion is a flat surface, a bottom surface of the sealing piece is also a flat surface, the top surface of the top cover plate connecting portion is fitted with the bottom surface of the sealing piece.

8. The top cover of the power battery according to claim 2, characterized in that, the sealing piece is arranged around the top cover plate connecting portion, and is pressed and sealed with a lower surface of the top cover plate.

9. The top cover of the power battery according to claim 8, characterized in that, a sealing piece accommodating slot is provided on the insulation piece, the sealing piece accommodating slot is provided around the top cover plate connecting portion, the sealing piece is arranged in the sealing piece accommodating slot.

10. The top cover of the power battery according to claim 8, characterized in that, the sealing piece is of a circular ring shape.

11. The top cover of the power battery according to claim 8, characterized in that, the insulation piece is integratedly formed, the sealing piece protrudes from an upper surface of the insulation piece.

12. The top cover of the power battery according to claim 11, characterized in that, the sealing piece is a ring flange.

13. The top cover of the power battery according to claim 1, characterized in that, the top cover plate connecting portion is integratedly or separately arranged with the insulation piece.

14. A power battery, characterized in that, comprising the top cover of the power battery according to claim 1.

* * * * *